(12) United States Patent
Wouhaybi et al.

(10) Patent No.: US 10,599,751 B2
(45) Date of Patent: Mar. 24, 2020

(54) HYBRID MOBILE INTERACTIONS FOR NATIVE APPS AND WEB APPS

(71) Applicant: Intel Corporation, Santa Clara, CA (US)

(72) Inventors: Rita H. Wouhaybi, Portland, OR (US); David Shaw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 15/446,462

(22) Filed: Mar. 1, 2017

(65) Prior Publication Data

US 2017/0228352 A1 Aug. 10, 2017

Related U.S. Application Data

(63) Continuation of application No. 13/992,464, filed as application No. PCT/US2011/067642 on Dec. 28, 2011, now Pat. No. 9,600,455.

(51) Int. Cl.
*G06F 17/22* (2006.01)
*G06F 3/0488* (2013.01)
(Continued)

(52) U.S. Cl.
CPC ........ *G06F 17/2247* (2013.01); *G06F 3/0482* (2013.01); *G06F 3/0486* (2013.01);
(Continued)

(58) Field of Classification Search
CPC ............. G06F 17/2247; G06F 3/04883; G06F 3/04886; G06F 3/04817; G06F 3/0486;
(Continued)

(56) References Cited

U.S. PATENT DOCUMENTS 6,008,809 A * 12/1999 Brooks ................. G06F 3/0481
715/792
8,375,295 B2 2/2013 Zalewski
(Continued)

FOREIGN PATENT DOCUMENTS

CN 101686280 3/2010
KR 1020110026811 3/2011
(Continued)

OTHER PUBLICATIONS

Notification to Grant Patent Right dated Jul. 25, 2017 in Chinese Patent Application No. 201180075928, and partial summarized English translation.
(Continued)

*Primary Examiner* — Andrew L Tank
(74) *Attorney, Agent, or Firm* — Christopher K. Gagne

(57) ABSTRACT

There is disclosed a system, including apparatus, methods and computer programs, for running native software applications (apps) and HTML5 web-based apps on a computing device, particularly a mobile computing device, in a multi-tasking mode of operation. In one embodiment, touch screen displays having one or more browsers are adapted to run one or more HTML5 apps, and receive input from hand gestures. One or more software modules execute on the operating system and are responsive to a dragging gesture applied to an HTML5 app displayed in a full screen mode, to subdivide the screen display and display the HTML5 app in one of the subdivided areas and display icons used to launch a second HTML5 app in a different one of the subdivided areas. The second HTML5 app is run concurrently with the first HTML5 app in order to provide multi-tasking between the first and second apps.

30 Claims, 10 Drawing Sheets

(51) Int. Cl.
  *G06F 3/0481* (2013.01)
  *G06F 3/0486* (2013.01)
  *G06F 3/0482* (2013.01)

(52) U.S. Cl.
  CPC ........ *G06F 3/0488* (2013.01); *G06F 3/04817* (2013.01); *G06F 3/04883* (2013.01); *G06F 3/04886* (2013.01); *G06F 2203/04803* (2013.01); *G09G 2370/10* (2013.01)

(58) Field of Classification Search
  CPC ................. G06F 3/0488; G06F 3/0482; G06F 31/04886; G06F 2203/04803; G09G 2370/10
  USPC .................. 715/240, 760, 792, 835, 863
  See application file for complete search history.

(56) References Cited

U.S. PATENT DOCUMENTS

| | | | |
|---|---|---|---|
| 8,473,870 | B2 | 6/2013 | Hinckley |
| 8,600,446 | B2 | 12/2013 | Chiang |
| 8,677,284 | B2 * | 3/2014 | Aguilar ............... G06F 3/04815 715/830 |
| 8,990,733 | B2 * | 3/2015 | Deutsch ............... G06F 3/0481 715/835 |
| 9,600,455 | B2 | 3/2017 | Wouhaybi |
| 2007/0033569 | A1 | 2/2007 | Davidson |
| 2009/0055749 | A1 | 2/2009 | Chatterjee |
| 2010/0081475 | A1 | 4/2010 | Chiang |
| 2010/0248788 | A1 * | 9/2010 | Yook .................... G06F 3/0481 455/566 |
| 2010/0257447 | A1 | 10/2010 | Kim |
| 2011/0107272 | A1 | 5/2011 | Aguilar |
| 2011/0175930 | A1 | 7/2011 | Hwang |
| 2011/0208852 | A1 | 8/2011 | Looney |
| 2011/0244924 | A1 * | 10/2011 | Jung .................... G06F 3/0481 455/566 |
| 2011/0252357 | A1 | 10/2011 | Chaudhri |
| 2011/0252446 | A1 | 10/2011 | Jeong |
| 2012/0066628 | A1 | 3/2012 | Ens |
| 2012/0131519 | A1 * | 5/2012 | Jitkoff .................. G06F 3/0481 715/863 |
| 2013/0145290 | A1 | 6/2013 | Weber |
| 2013/0159892 | A1 * | 6/2013 | Suraj .................... G06F 3/048 715/762 |

FOREIGN PATENT DOCUMENTS

| | | |
|---|---|---|
| TW | 201129907 | 9/2011 |
| WO | 2009018277 | 2/2009 |
| WO | 2010110613 | 9/2010 |
| WO | 2011068474 | 6/2011 |
| WO | 2011099803 | 8/2011 |

OTHER PUBLICATIONS

Office Action dated Feb. 14, 2017 in Chinese Patent Application No. 201180075928, and partial summarized English translation.
Supplemental search report dated Feb. 6, 2018, in Chinese Patent Application No. 201180075928.
Office Action dated Jun. 3, 2016 in Chinese Patent Application No. 201180075928, and partial summarized English translation.
Search report dated May 26, 2016 in Chinese Patent Application No. 201180075928.
Decision to refuse application dated Nov. 20, 2018 in European Patent Application No. 11878489, and related attachments.
Summons to attend oral proceedings dated Jun. 7, 2018 in European Patent Application No. 11878489, and related attachments.
Android Shortcut to Homescreen, youtube, dated Oct. 5, 2011, retrieved on Apr. 26, 2018, from URL: https://www.youtube.com/watch?v=1Ur4u2KA7RY.
Office Action dated Oct. 9, 2017 in European Patent Application No. 11878489, and related attachments.
Invitation dated Aug. 25, 2015 in European Patent Application No. 11878489.
Extended European Search Report dated Aug. 6, 2015 in European Patent Application No. 11878489, and related attachments.
International Preliminary Report on Patentability dated Jul. 1, 2014 in PCT application No. PCT/US2011/067642.
Written Opinion dated Sep. 27, 2012 in PCT application No. PCT/US2011/067642.
International Search Report dated Sep. 27, 2012 in PCT application No. PCT/US2011/067642.
Office Action dated Jan. 30, 2019 in European Patent Application No. 17188829, and related attachments.
Invitation dated Feb. 26, 2018 in European Patent Application No. 17188829.
Extended European Search Report dated Dec. 19, 2017 in European Patent Application No. 17188829, and related attachments.
Office Action dated May 27, 2015, in Taiwanese Patent Application No. 101149335.
Office Action dated Jan. 29, 2015 in Taiwanese Patent Application No. 101149335, and related attachments (including search report).
Office Action dated Jun. 3, 2016 in Chinese Patent Application No. 201180075928, related attachments, and partial summarized English translation.
Notice of Allowance dated Jul. 25, 2016 in Taiwanese Patent Application No. 101149335, related attachments, and partial summarized English translation.
Notice of Allowance dated Nov. 4, 2016, in U.S. Appl. No. 13/992,464, and related attachments.
Office Action dated Mar. 28, 2016, in U.S. Appl. No. 13/992,464, and related attachments.
Office Action dated Aug. 13, 2015 in U.S. Appl. No. 13/992,464, and related attachments.
Office Action dated Feb. 27, 2015 in U.S. Appl. No. 13/992,464, and related attachments.
Office Action dated Nov. 19, 2019 in Chinese Patent Application No. 201710513082.3 and related attachments.
Office Action dated Jan. 23, 2020 in European Patent Application No. 17188829.0 and related attachments.

\* cited by examiner

HYBRID MOBILE INTERACTIONS FOR NATIVE APPS AND WEB APPS

PRIORITY APPLICATIONS

This application is a continuation of U.S. application Ser. No. 13/992,464, filed. Jun. 7, 2013, now issued as U.S. Pat. No. 9,600,455, which is a U.S. National Stage Application under 35 U.S.C. 371 from International Application No. PCT/US2011/067642, filed Dec. 28, 2011, published as WO 2013/100990, all of which are hereby incorporated by reference in their entirety.

TECHNICAL FIELD

The present subject matter relates generally to the field of computers, and more particularly to browser-based applications and user interface displays.

BACKGROUND

HTML5 is a language for structuring and presenting content for the World Wide Web. It is the fifth revision of the HTML standard and as of November 2011 is still under development. Its core aims have been to improve the language with support for the latest multimedia while keeping it easily readable by humans and consistently understood by computers and devices (web browsers, parsers, etc.). HTML5 is intended to subsume not only HTML 4, but XHTML1 and DOM2 HTML (particularly JavaScript/EMCAScript) specifications as well. Many features of HTML5 are provided to enable its use on low-powered devices such as smart phones and tablets. HTML5 supports a variety of techniques to enable dynamic content presentations, including multimedia display elements (such as video, audio, and graphical animation), application caching, background threading, and integrated scripting support.

HTML5 is a disruptive technology and a set of standards. One of its many advantages is allowing apps to run inside a browser, and breaking the model of apps having to be native code and distributed through an app store, or manually installed to a device by a user. This is exceptionally attractive to developers who want to develop apps and sell them without having to share their revenues with app distributors or platform manufacturers. In addition, with HTML5, web apps running inside the browser provide an opportunity to support multitasking and to break from the fragmented world of apps under different operating systems and platforms. This provides an incentive for developers to move to HTML5 and away from native apps, since multitasking has been a leading request of users of mobile platforms. In addition, developers only have to develop one app in HTML5, and it will run on all platforms that support HTML5.

DETAILED DESCRIPTION

Figure 1A:
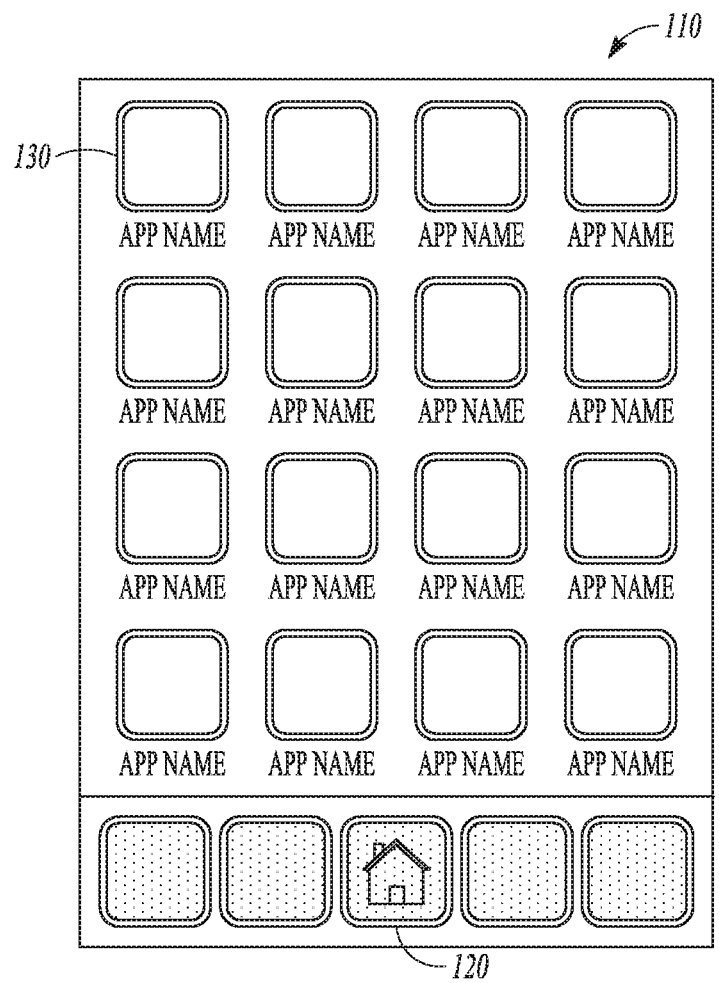
FIGS. 1A and 1B illustrate an example interface and system for launching and executing mobile apps used in connection with an example embodiment.
Figure 1B:
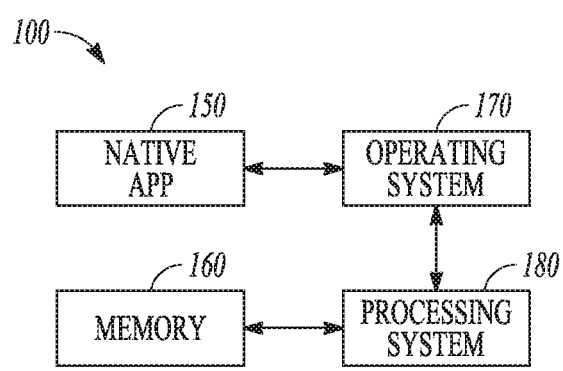

Popular and widely used home screens on mobile devices, such as mobile phones or tablet computers, contain graphical icons that provide links to native apps downloaded and installed on the devices. Users may launch the native apps by selection of the links, for example using a pointing device or touch screen. One example of such an interface and mobile device, illustrated in FIGS. 1A and 1B, is intuitive and easy to operate, and has become the de-facto standard for mobile interactions. In the interface of FIG. 1A, provided by the mobile device 100 of FIG. 1B, native apps are represented by icons (e.g., icon 130), typically rectangular in shape, displayed on the home (or other) screen 120 of the user interface 110 of mobile device 100. When a user selects a native app 150, for example by pressing on the icon 130 associated therewith, the native app 150 launches, is loaded in whole or in part in the memory 160, and begins execution in a full screen mode, typically occupying the entire screen of the mobile device 100. Native apps may be formed of software modules including one or more computer programs.

Further referring to FIG. 1B, the term "native app," as used herein, refers to an app that is loaded, in whole or in part, in memory 160, and executes, at least in part, using instructions and capabilities of an operating system 170. The native app 150 may be specifically designed to run within the device's operating system 170 and machine firmware environment, and may need to be adapted for operation on different hardware or operating system types. Operating system 170 includes a plurality of software modules and is resident on and executing on a processing system 180. Processing system 180, in one example embodiment, includes a processing device capable of executing computer software, such as a central processing unit (CPU), of the mobile device 100.

Figure 2:
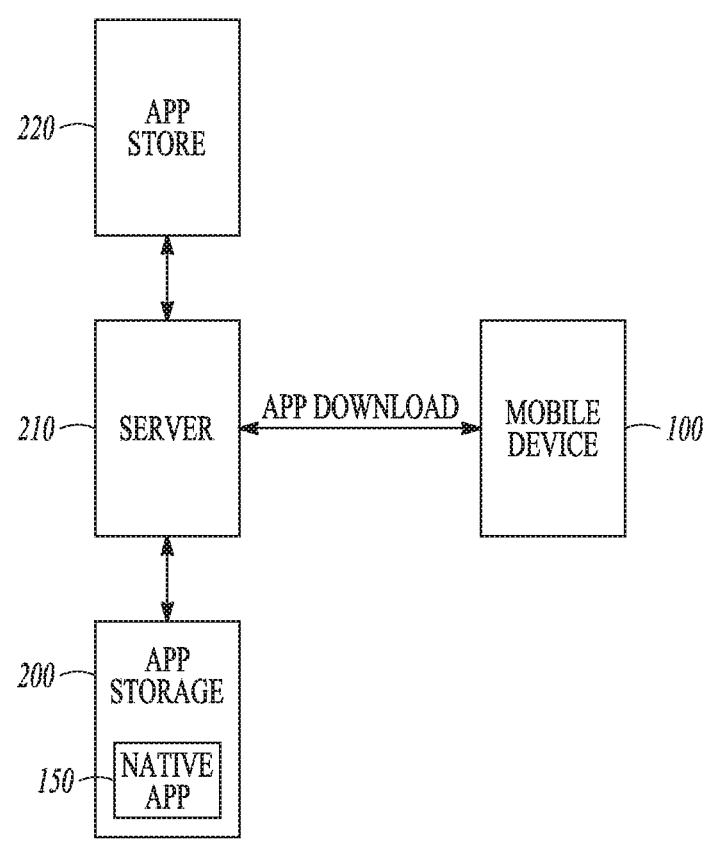
FIG. 2 illustrates an example system for downloading native apps to a mobile device.

Native app 150, in one model of distribution illustrated in FIG. 2, is downloaded to the mobile device 100 responsive to interaction with an interface such as app store 220, operating under the control of a device-accessible server 210. An app storage facility such as app storage 200 provides an installable copy of native app 150, and may be accessed by the user responsive to interactions with the app store 220 and the server 210. For example, the app store 220 may display a catalog of available apps for user selection, and may collect a fee from a user to license and download a copy of the native app 150.

As described herein, there is provided a system, including methods, apparatus, software, and user interfaces, for user interaction with apps. The system supports backward compatibility with the above-described native app interface scheme, while enabling users to take advantage of desirable new capabilities of web apps (for example, HTML5-standard compliant web apps, further referred to herein as "HTML5 apps"). A web app is typically coded in a browser-rendered language such as HTML combined with JavaScript, and is designed for a lightweight execution in a browser graphical user interface environment.

Figure 3A:
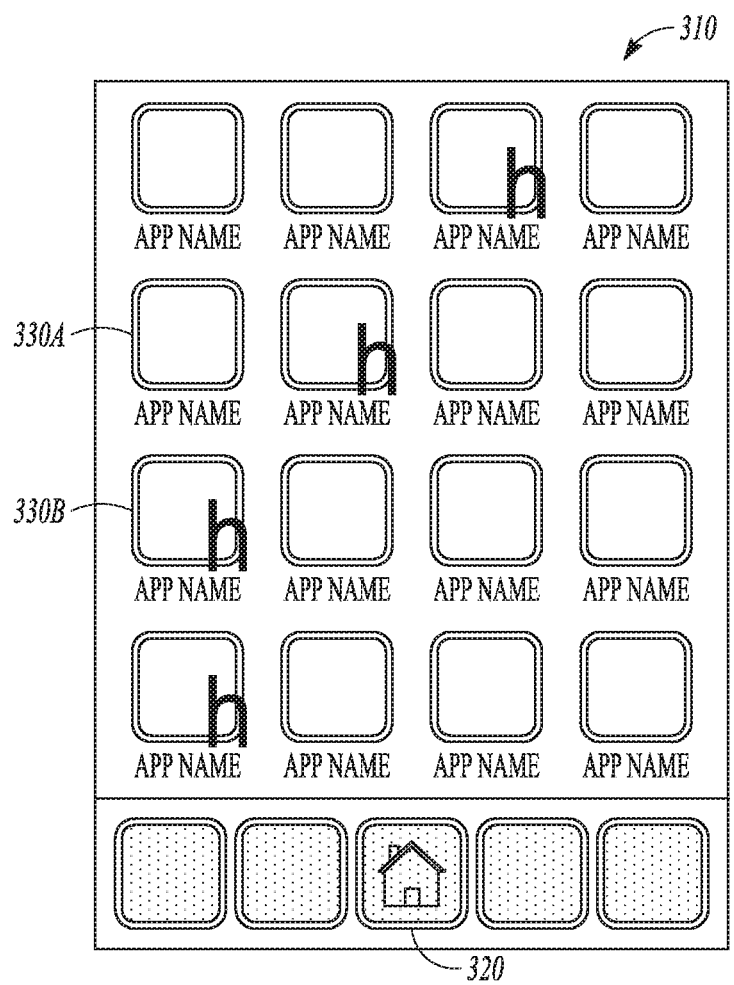
FIGS. 3A and 3B illustrate an example interface and system for running native and HTML5 apps on a mobile device according to an example embodiment.

In one embodiment, user interactions with web apps are provided by a similar user interface as used for native apps. As illustrated in FIG. 3A, non-HTML apps are represented by icon 330a and HTML5 apps are represented by icon 330b, and icons 330a and 330b are comingled and displayed on the home (or other) screen 320 of the user interface 310 of mobile device 300. In FIG. 3A, HTML5 app icons 330b are specially noted with the letter "h"; however, there is no requirement for the HTML5 apps to be so labeled or noted—it is done here only for illustrative purposes. Thus, icons for HTML5 apps may be indistinguishable from icons for native apps.

As described further herein, the following techniques and system configurations provide for interactions with mobile apps, including native app 350a and HTML5 app 350b, accommodating for backward compatibility. Thus, a user may still use a familiar interface to interact with the native app 350a, such as the familiar interface of FIG. 1A, while enabling the user to see, use, interact with, and take advantage of HTML5 app 350b. The following described techniques are also extendable to allow for multi-tasking among web apps, provided by the use of HTML5 apps because of concurrent execution and display of multiple web pages and apps provided within or in connection with the same instance of a browser runtime.

Figure 3B:
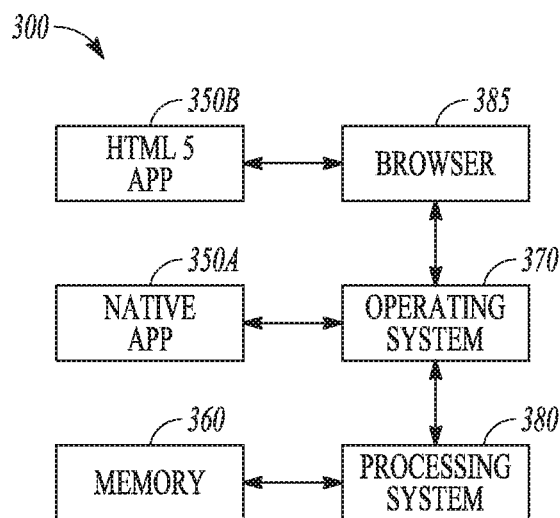

As illustrated in FIG. 3B, native app 350a is loaded in whole or in part in a memory 360, and executes, at least in part, using instructions and capabilities of an operating system 370 resident on and executing on a processing system 380, including a central processing unit (CPU), of the mobile device 300. HTML5 app 350b operates within an HTML5 compliant browser 385 that in turn runs within operating system 370, as opposed to a native app 350a executing directly on operating system 370.

According to one example embodiment, user interface control software is formed from one or more software modules and is operable on operating system 370, is part of the browser 385, and/or is integral with the operating system, in order to perform the functionality described above and the other example alternate embodiments described thereafter. User interface control software accepts user control input from the user interface in any form, such as touch, pointing device, voice, gaze, or any other means, in order to perform the user input described above, and includes computer program code operable on the operating system 370 to control the display in order to effectuate the user interface display features and information exchange also described above and the ensuing description of alternate embodiments.

Figure 4:
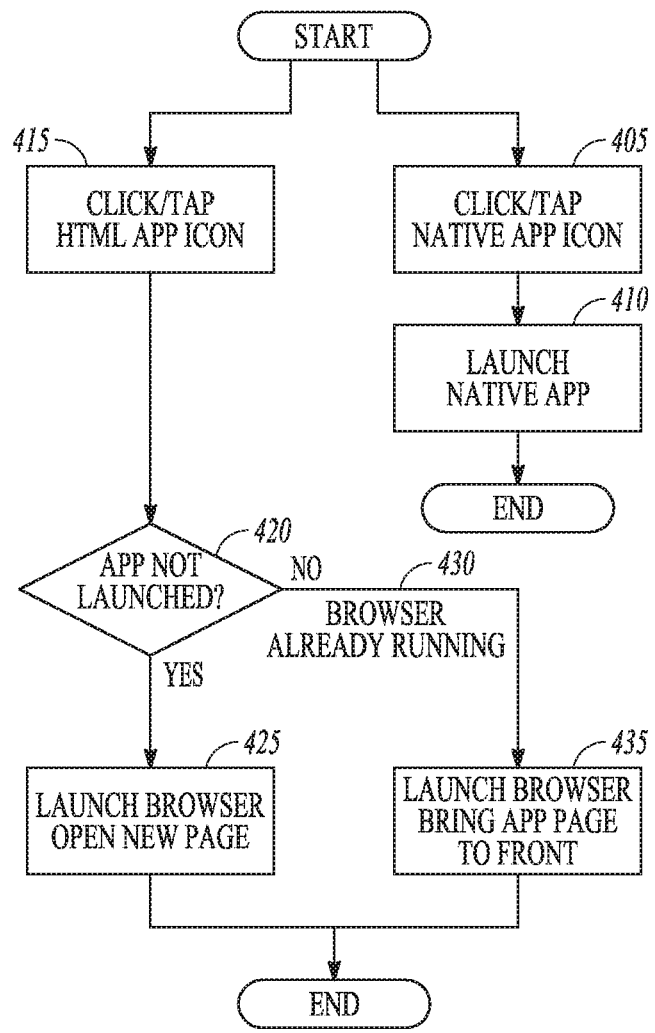
FIG. 4 illustrates a method for launching a native app or an HTML5 app on a mobile device according to an example embodiment.

As illustrated in FIG. 4, when a user selects (405) (e.g., clicks or taps) a native app icon 330a, the interactions are the same as described with respect to typical operation of a native app as described in reference to FIGS. 1A and 1B, in the sense that the corresponding native app 350a launches (410) and occupies the entire display. However, when a user selects (415) an HTML5 app icon 330b, one of two things may occur:

1. If the corresponding app 350b is determined (420) as not being launched (e.g., is not presently in memory 360), the browser 385 is launched and a new page is opened (425). For example, the app URL is launched in the new page, whether the URL is pointing to a location on the local device or over the network; or 2. If the app 350b is already running (430) in the browser 385, the browser is launched (435) and the page where the app is running is brought to the front. According to one example embodiment, it is possible for the app developer to override this behavior by including parameters such as "<on exit=kill app>" or "<on launch-reload app>" which will remove any previous instances from memory and restart the app.

Figure 5:
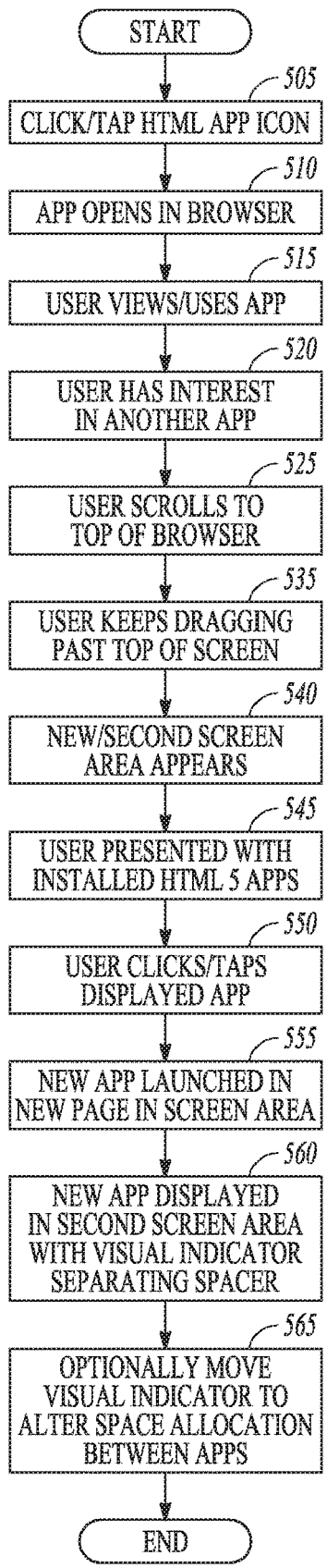
FIG. 5 illustrates a method for launching two or more HTML5 apps in a multi-tasking mode of operation according to an example embodiment.

As indicated above, with HTML5, an HTML5 app 350b that runs inside a browser environment such as the browser 385 provides an opportunity to support multitasking. According to another example embodiment, including a method illustrated in FIG. 5, and user interface layouts illustrated FIGS. 6A, 6B and 6C, interactions with the user may be performed in the following manner:

1. A user selects (505) an HTML5 app icon 330b (for example, to launch an online shopping web app).

2. The HTML5 app 350b opens (510) in the browser 385.

Figure 6A:
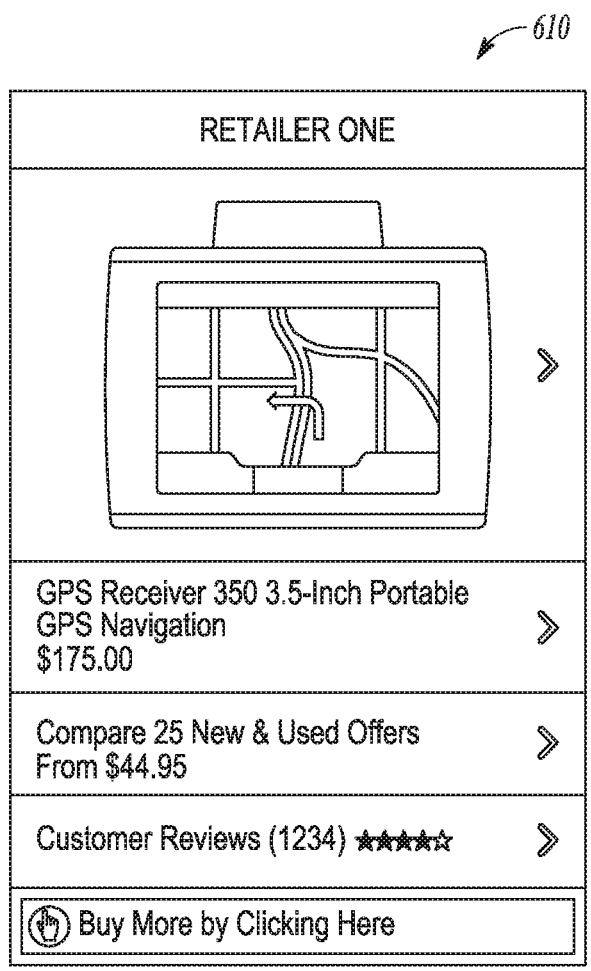
FIGS. 6A, 6B, and 6C illustrate a user interface enabled to launch two or more HTML5 apps in a multi-tasking mode of operation according to an example embodiment.

3. The user then proceeds to view, use, and otherwise interact with the app (515). For example, in an online shopping web app, this may include performing interaction with a product listing, such as a GPS device in an online shopping interface 610 as shown in FIG. 6A.

4. The user is then interested (520) in viewing another app on the mobile device screen, such as to cross reference information or perform a comparison between information displays in two apps. In the online shopping web app example, the user may want to compare prices of the product using another retailer's app or website.

Figure 6B:
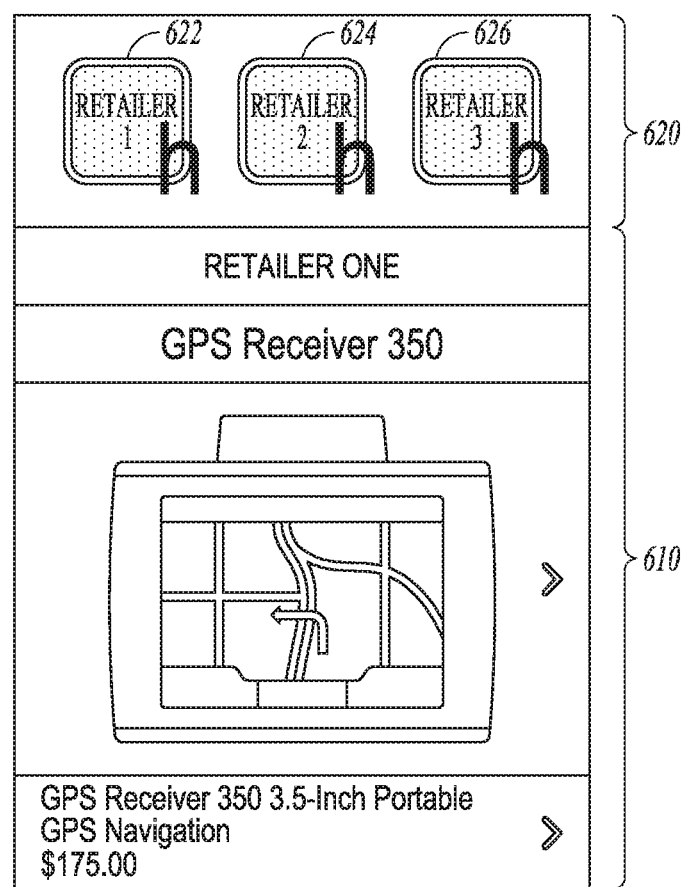

5. The user scrolls (525) to the edge (e.g., the top) of the browser 385 displaying HTML5 app 350b. In a typical browser interaction, if the user drags the screen to the top of the browser 385 (with a dragging hand gesture or similar user interaction), the top of the browser such as the URL address bar may be shown, but nothing else is shown above the browser. In this embodiment, however, if the user keeps dragging past the top of the screen (535), for example attempting to navigate past the URL address bar, a new second, screen area appears (540), as shown in FIG. 6B. On the bottom of the interface shown in FIG. 6B is the "current" browser screen, the Retailer One web app 610; however on the top of the interface, the user is presented (545) with a listing 620 of available HTML5 apps on the device, including icons 622, 624, 626. In one example embodiment, the icon of the currently displayed HTML5 app (the icon 622 corresponding to the displayed Retailer One web app 610) could have an indication that it already is open or being displayed (for example, by shading the icon 622 grey).

Figure 6C:
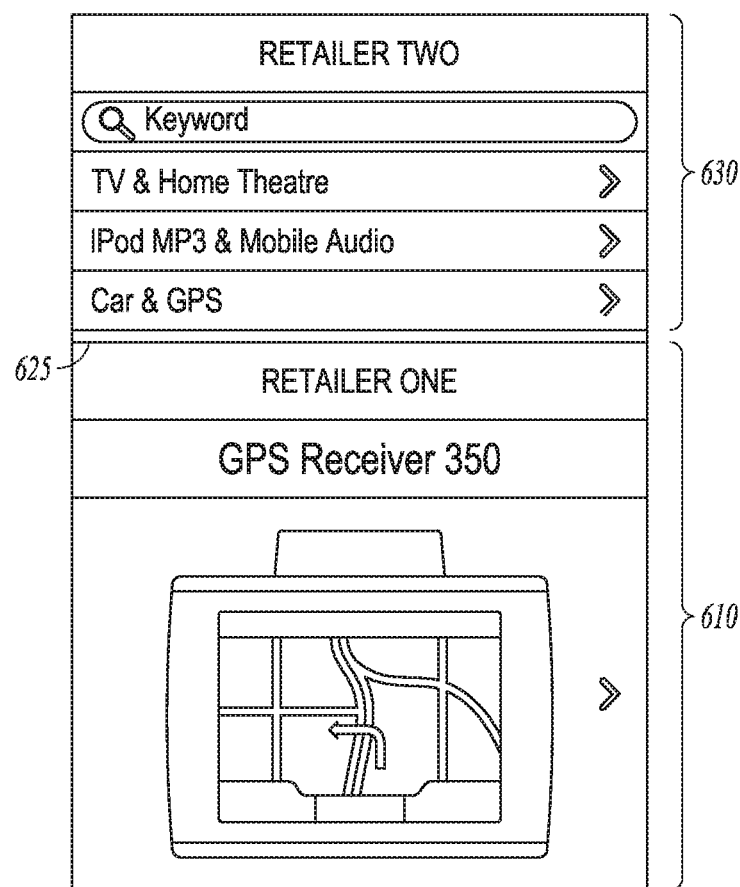

6. The user may then select (550) one of the displayed app icons 622, 624, 626. This will launch (555) that HTML5 app into a new page, or an existing page if the app is already running. In one configuration, the new app will not occupy the entire screen, rather, the screen will be split (560) and the two apps will share the space with a visual indicator 625 separating them. This is illustrated in FIG. 6C, with selected HTML5 app for Retailer Two 630 being displayed on the top portion of the screen; and the HTML5 app for Retailer One 610 being displayed on the bottom portion of the screen. The visual indicator 625 may be moved (565), for example with a touch and drag motion, to allow more, or less, space for a particular application.

According to another embodiment, the system and method supports multiple splitting of the screen. In the case of mobile phones, the interface may not be usable due to screen size or screen resolution, so the browser may limit the number of screen splits. However, in cases where bigger screens and surfaces are available, such as a tablet, or if the smaller screen may be extended or projected into a bigger screen, the browser will support many of those presented in the active space. While the screen splits shown in FIGS. 6B and 6C split the screen into two or more vertical sections, the screen may also be split horizontally. In some examples, the orientation of the split (e.g., vertical or horizontal) may depend on the device's orientation as determined by a position sensor in the device and may even change from vertical to horizontal (or vice versa) based on a change in device orientation.

In yet another example embodiment, one app contains the sub-screens. For example, this functionality may be used in shopping apps where the app can open many sites as child sub-apps inside the parent app and allow the user to browse the individual pages and information tabs from various retailers to compare delivery, shipping, reviews, and such. Thus, a single browser instance may be used to launch multiple windows of web apps. In an alternative embodiment, a first browser may provide one of the subdivided areas on the screen display to display a first web app, and a second browser may provide a different one of the subdivided areas on the screen display to display a second web app. Other combinations of multiple browser instances and browser windows may also be provided.

In yet another example embodiment, the HTML5 apps are enabled to interact with each other and exchange information, for example, copy and paste or even competitive comparison. In one example embodiment, this is supported by a user-controlled copy and paste or a drag and drop feature to provide the interaction between the split screens. For example, performing a drag and drop of text from one web app to another, may automatically activate a text search into the web app having the screen section receiving the drop or paste.

Accordingly, as described above, one browser configuration supports multiple pages running at the same time inside a single browser, while users may view the corresponding pages and web apps of the respective browser windows s concurrently. In other browser configurations, multiple browser instances may provide concurrent display of the corresponding pages and web apps of the respective browser instances concurrently. The corresponding pages and web apps also may be executed in the browser environment by concurrent execution within the browser or browsers.

Although several of the described embodiments were included with reference to the use of HTML5-based markup language standards, it will be understood that the present techniques may be implemented in connection with a variety of dynamic web app platforms and markup language standards. Therefore, the usage of the term "HTML5 app" is not necessarily intended to be limiting to the use of a published draft or standard labeled as "HTML5" by the World Wide Web Consortium (W3C).

As described herein, various methods or techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 7:
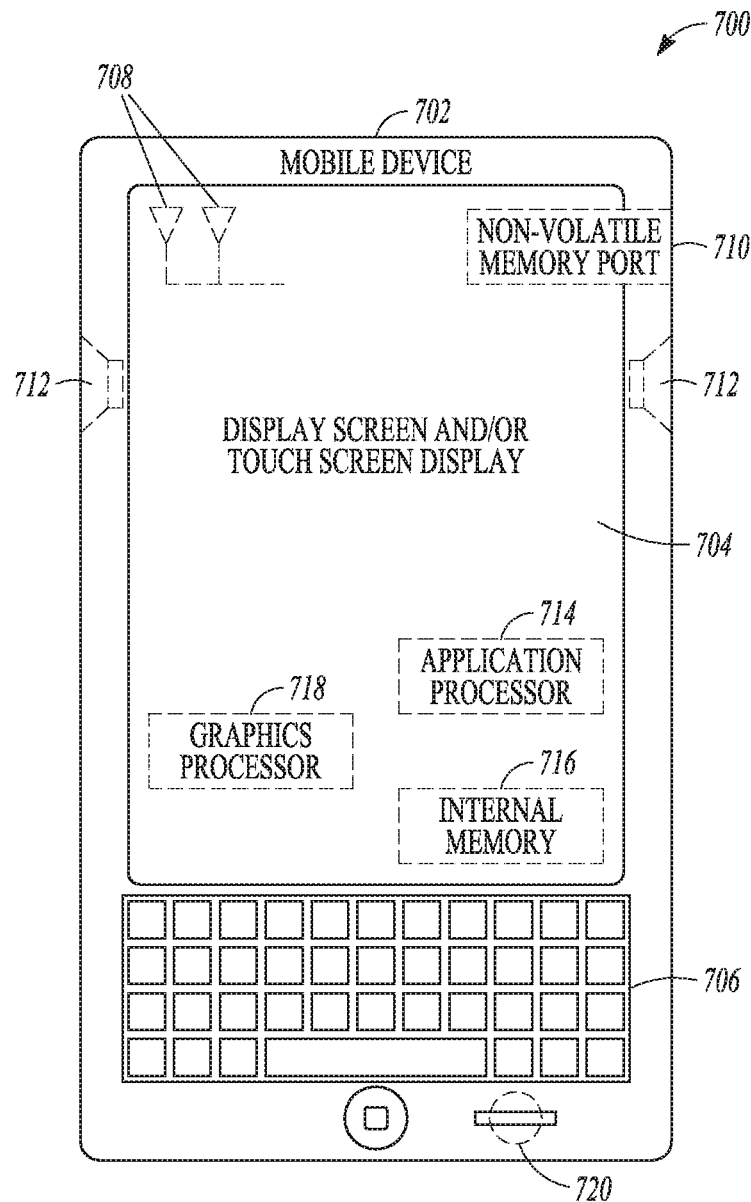
FIG. 7 illustrates an example mobile device on which the systems described herein may be deployed.

FIG. 7 provides an example illustration of a mobile device 700, such as a user equipment (UE), a mobile station (MS), a mobile wireless device, a mobile communication device, a tablet, a handset, or other type of mobile wireless device. The mobile device may include one or more antennas 708 configured to communicate with a base station (BS), an evolved Node B (eNB), or other type of wireless wide area network (WWAN) access point. The mobile device may be configured to communicate using at least one wireless communication standard including 3GPP LTE, WiMAX, High Speed Packet Access (HSPA), Bluetooth, and WiFi. The mobile device 700 may communicate using separate antennas for each wireless communication standard or shared antennas for multiple wireless communication standards. The mobile device may communicate in a wireless local area network (WLAN), a wireless personal area network (WPAN), and/or a wireless wide area network (WWAN).

FIG. 7 also provides an illustration of a microphone 720 and one or more speakers 712 that may be used for audio input and output from the mobile device 700. The display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen.

Figure 8:
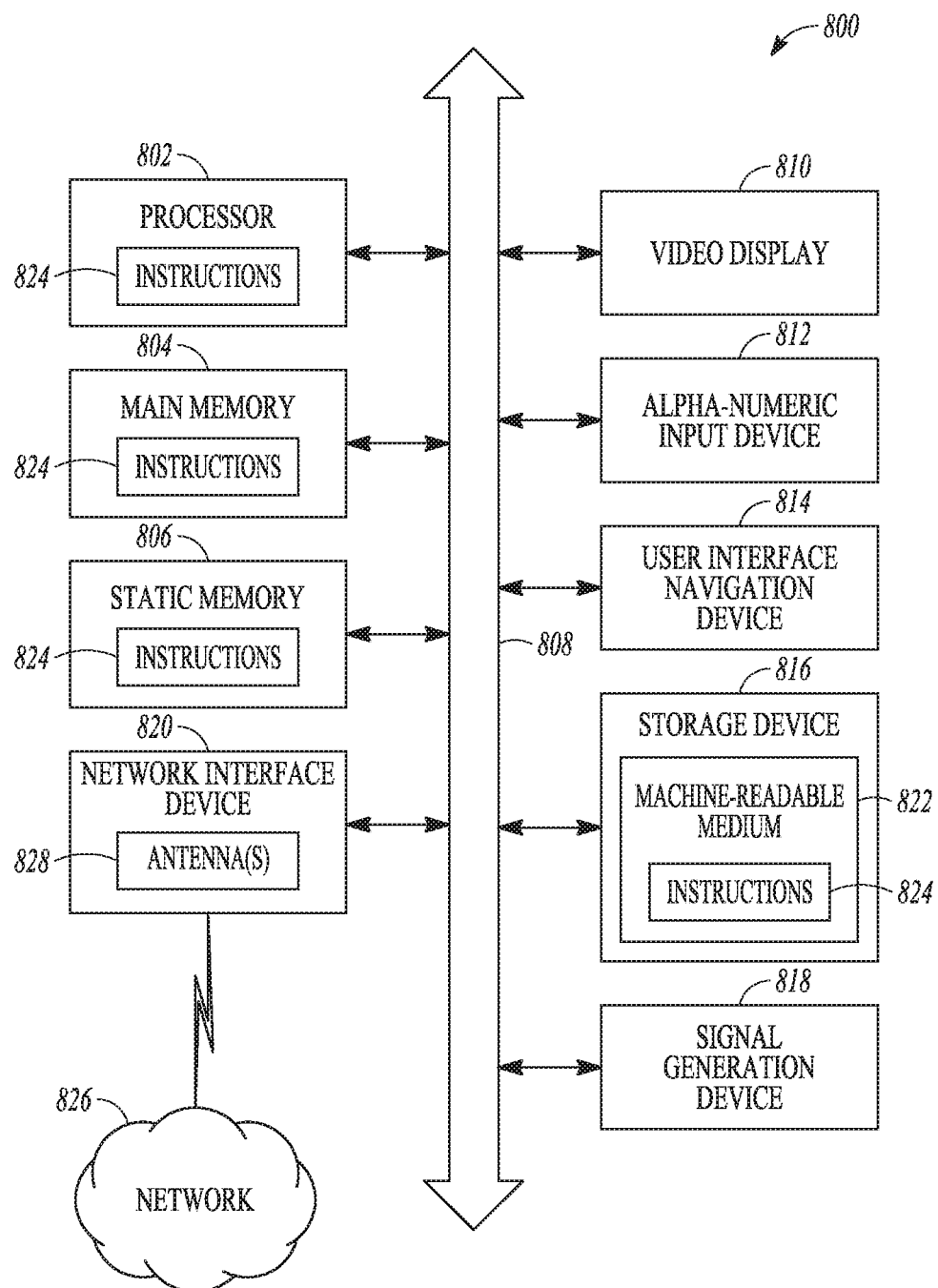
FIG. 8 illustrates an example computer system that may be used as a computing platform for the computing devices described herein.

FIG. 8 is a block diagram illustrating an example computer system machine upon which any one or more of the methodologies herein discussed may be run. Computer system 800 may be used as the processing system 380, or for any other computing platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 80 (e.g., a central processing unit (CPU), a graphics processing unit (GPU) or both), a main memory 804 and a static memory 806, which communicate with each other via an interconnect 808 (e.g., a bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system 800 may additionally include a storage device 816 (e.g., a drive unit), a signal generation device 818 (e.g., a speaker), a network interface device 820 (which may include or operably communicate with one or more antennas 828, transceivers, or other wireless communications hardware), and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. For example, a component or module may be implemented as a hardware circuit comprising custom VLSI circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module. For example, in the context of the present disclosure, a component or module configured to respond to user commands to subdivide a screen display may be either included within, or separate from, the computing system, operating system, browser, or web application implementing such functionality.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes a computing device, comprising: a touch screen configured to provide a screen display and receive input from hand gestures; a computer system operative to control the screen display, the computer system including an operating system and one or more browsers configured for execution with the operating system, wherein the one or more browsers are configured to execute one or more web apps; and one or more software modules configured for execution with the operating system, the software modules configured to respond to a dragging hand gesture applied to a web app being displayed in a full screen mode within the one or more browsers, by: subdividing the screen display of the one or more browsers into multiple subdivided areas, and displaying the web app within one of the subdivided areas; launching a second web app and displaying the second web app within a different one of the subdivided areas; and providing concurrent display of the web app and the second web app in a split-screen mode to facilitate user multitasking.

In Example 2, the subject matter of Example 1 may optionally include the software modules being further configured to respond to the dragging hand gesture by: displaying one or more icons used to accept user input to select and launch the second web app, the icons displayed within the different one of the subdivided areas.

In Example 3, the subject matter of one or any combination of Examples 1-2 may optionally include each of the web app and the second web app being coded in a browser-renderable markup language compliant with an HTML5 markup language standard, and wherein the one or more browsers are further configured to render web apps coded in a markup language compliant with the HTML5 markup language standard.

In Example 4, the subject matter of one or any combination of Examples 1-3 may optionally include the software modules being further configured to respond to a second hand gesture applied to the concurrent display of the web app and the second web app by: resizing display proportions between the web app and the second web app in the split-screen mode.

In Example 5, the subject matter of one or any combination of Examples 1-4 may optionally include the software modules being further configured to respond to one or more user commands during the concurrent display of the web app and the second web app by: communicating information between the web app and the second web app.

In Example 6, the subject matter of one or any combination of Examples 1-5 may optionally include the software modules being further configured to provide concurrent display of the web app, the second web app, and one or more additional web apps in the split-screen mode.

In Example 7, the subject matter of one or any combination of Examples 1-6 may optionally include the software modules being further configured to provide concurrent execution and concurrent display for the web app and the second web app.

In Example 8, the subject matter of one or any combination of Examples 1-7 may optionally include the one or more software modules being provided by the one or more browsers.

In Example 9, the subject matter of one or any combination of Examples 1-8 may optionally include the one or more browsers including a first browser providing the one of the subdivided areas, and a second browser providing the different one of the subdivided areas.

Example 10 may include, or may optionally be combined with the subject matter of one or any combination of Examples 1-9 to include a method, comprising: displaying, in a full screen mode of a screen display, a web app within a browser user interface; detecting one or more user commands applied within the browser user interface during the full screen mode to subdivide the screen display and launch a second app; and partitioning the screen display into multiple subdivided areas responsive to detecting the user commands, including: resizing a display of the web app to one of the subdivided areas; and allocating the second app to display in a different one of the subdivided areas; wherein the second app is concurrently executed and presented with the web app.

In Example 11, the subject matter of Example 10 may optionally include user commands that include one or more hand gestures applied to a touch screen, the touch screen configured to provide the screen display.

In Example 12, the subject matter of one or any combination of Examples 10-11 may optionally include hand gestures that include a dragging motion applied to an edge of the browser user interface.

In Example 13, the subject matter of one or any combination of Examples 10-12 may optionally include displaying one or more icons used to select and launch the second app, the icons displayed within the different one of the subdivided areas.

In Example 14, the subject matter of one or any combination of Examples 10-13 may optionally include the web app being provided according to a browser-renderable markup language compliant with an HTML5 markup language standard.

In Example 15, the subject matter of one or any combination of Examples 10-14 may optionally include changing an allocation of the plurality of subdivided areas in the screen display responsive to detecting one or more additional user commands.

In Example 16, the subject matter of one or any combination of Examples 10-15 may optionally include communicating information between the first web app and the second app.

In Example 17, the subject matter of one or any combination of Examples 10-16 may optionally include the second app being a web app executing in the browser user interface.

In Example 18, the subject matter of one or any combination of Examples 10-17 may optionally include the second app being a native app not executing in the browser user interface.

Example 19 may include, or may optionally be combined with the subject matter of one or any combination of Examples 1-18 to include at least one machine readable storage medium comprising a plurality of instructions that, in response to being executed on a computing device, cause the computing device to provide a browser graphical user interface configured to: display a first web app in a full-screen mode of a screen display; provide a selectable listing of one or more additional web apps for display, the one or more additional web apps including a second web app; receive one or more user commands to display the second web app concurrently with the first web app; and display the second web app and the first web app in a split-screen mode of the screen display.

In Example 20, the subject matter of Example 19 may optionally include user commands that include one or more hand gestures applied to a touch screen, the touch screen configured to provide the screen display.

In Example 21, the subject matter of one or any combination of Examples 19-20 may optionally include hand gestures that include a dragging motion applied to an edge of the browser graphical user interface.

In Example 22, the subject matter of one or any combination of Examples 19-21 may optionally include providing the listing of the one or more additional web apps including displaying a listing of icons representing the one or more additional web apps, wherein receiving the one or more user commands to display the second web app includes detecting a user selection of an icon from the listing of icons representing the second web app.

In Example 23, the subject matter of one or any combination of Examples 19-22 may optionally include each of the first web app and the second web app being coded in a browser-renderable markup language compliant with an HTML5 markup language standard.

In Example 24, the subject flatter of one or any combination of Examples 19-23 may optionally include the browser graphical user interface being further configured to: receive one or more user commands to resize display proportions between the first web app and the second web app in the split-screen mode; and responsive to the user commands to resize display proportions, update the screen display of the first web app and the second web app.

In Example 25, the subject flatter of one or any combination of Examples 19-24 may optionally include the browser graphical user interface being further configured to: communicate information between the first web app and the second web app.

The Abstract of the Disclosure is intended to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A tablet mobile computing device that is capable, when the tablet mobile computing device is in operation, of wirelessly communicating, at least in part, via at least one Internet network, with an app store associated with a remote server, the tablet mobile computing device comprising:
    a network interface that comprises at least one antenna;
    a touch screen display;
    at least one processor;
    storage capable of storing, at least in part, instructions that correspond to a plurality of apps and an operating system, the instructions being capable of being executed, at least in part, by the at least one processor, the instructions, when executed, at least in part, by the at least one processor resulting, at least in part, in the tablet mobile computing device being capable of performing operations comprising:
    displaying, via the touch screen display, a plurality of user selectable icons corresponding, at least in part, to the plurality of apps;
    receiving, at least in part, via the touch screen display, at least one user tap input associated with at least one of the plurality of user selectable icons, the at least one user tap input resulting, at least in part, in selection for execution of at least one of the plurality of apps that corresponds, at least in part, to the at least one of the plurality of user selectable icons;
    displaying, via a first screen view of the touch screen display, information to be provided, at least in part, via at least one of the plurality of apps;
    receiving, at least in part, via the touch screen display, while the at least one of the plurality of apps is being executed and the information is being displayed, at least in part, via the first screen view, at least one other user input, the at least one other user input to be applied, at least in part, to an edge of the touch screen display, the at least one other user input comprising at least one dragging gesture;
    in response, at least in part, to the at least one other user input, displaying, via a second screen view of the touch screen display:
        at least one display area;
        at least one other display area; and
        at least one user visual indicator separating the at least one display area from the at least one other display area, the at least one display area being for display of the information, the at least one other display area being for display of others of the plurality of user selectable icons;
    receiving, at least in part, via the touch screen display, at least one other user tap input associated with at least one other of the plurality of user selectable icons, the at least one other user tap input resulting, at least in part, in selection, for execution, of at least one other of the plurality of apps that corresponds, at least in part, to the at least one other of the icons;
    in response, at least in part, to the at least one other user tap input, concurrently displaying, via the second screen view of the touch screen display:
        the information in the at least one display area; and
        other information to be provided, at least in part, via the at least one other of the plurality of apps, the other information to be displayed in the at least one other display area;
    wherein:
        the second screen view of the touch screen display comprises a split screen view of the touch screen display;
        the plurality of apps comprises at least one additional app that is capable of being wirelessly downloaded, via the at least one antenna and the at least one network, to the storage from the remote server based, at least in part, upon at least one user selection associated with a displayable available app catalog of the app store;
        in the operation of the tablet mobile computing device, the tablet mobile computing device is capable of providing, via the touch screen display, a virtual keyboard;
        in the operation of the tablet mobile computing device, the tablet mobile computing device is capable of concurrently executing both the at least one of the plurality of apps and the at least one other of the plurality of apps; and
        in the operation of the tablet mobile computing device, the tablet mobile computing device supports user-controlled dragging and dropping, between the at least one display area and the at least one other display area, of text for use in automatically activating a search.

2. The tablet mobile computing device of claim 1, wherein:
in the operation of the tablet mobile computing device:
the tablet mobile computing device is capable of displaying, via the touch screen display, user selectable home screen icons associated with native apps stored at the tablet mobile computing device;
the native apps are associated, at least in part, with capabilities of the operating system of the tablet mobile computing device.

3. The tablet mobile computing device of claim 1, wherein:
the at least one other of the plurality of apps is associated, at least in part, with at least one browser.

4. The tablet mobile computing device of claim 1, wherein:
in the split screen view of the touch screen display, the at least one display area and the at least one other display area are to be horizontally-oriented display areas.

5. The tablet mobile computing device of claim 1, wherein:
in the split screen view of the touch screen display, the at least one display area and the at least one other display area are to be vertically-oriented display areas.

6. The tablet mobile computing device of claim 1, wherein:
the tablet mobile computing device comprises a sensor to be used to determine, at least in part, orientation of tablet mobile computing device; and
in the split screen view of the touch screen display, display orientation of the at least one display area and the at least one other display area are to be changed based, at least in part, in part upon the orientation of the tablet mobile computing device.

7. The tablet mobile computing device of claim 1, wherein:
at least one visual indicator is movable, via at least one user touch and drag operation, so as to change the at least one display area and the at least one other display area; and
the storage comprises flash memory.

8. The tablet mobile computing device of claim 1, wherein:
the first screen view of the touch screen display is to be displayed via a full screen mode of the touch screen display; and
the split screen view of the touch screen display is to be displayed via a split screen mode of the touch screen display.

9. At least one non-transitory computer-readable storage medium storing instructions that capable of being executed by a tablet mobile computing device, the tablet mobile computing device being capable, when the tablet mobile computing device is in operation, of wirelessly communicating, at least in part, via at least one Internet network, with an app store associated with a remote server, the instructions corresponding, at least in part, to a plurality of apps and an operating system, the instructions when executed by the tablet mobile computing device resulting in the tablet mobile computing device being capable of performing operations comprising:
displaying, via a touch screen display of the tablet mobile computing device, a plurality of user selectable icons corresponding, at least in part, to the plurality of apps;
receiving, at least in part, via the touch screen display, at least one user tap input associated with at least one of the plurality of user selectable icons, the at least one user tap input resulting, at least in part, in selection for execution of at least one of the plurality of apps that corresponds, at least in part, to the at least one of the plurality of user selectable icons;
displaying, via a first screen view of the touch screen display, information to be provided, at least in part, via at least one of the plurality of apps;
receiving, at least in part, via the touch screen display, while the at least one of the plurality of apps is being executed and the information is being displayed, at least in part, via the first screen view, at least one other user input, the at least one other user input to be applied, at least in part, to an edge of the touch screen display, the at least one other user input comprising at least one dragging gesture;
in response, at least in part, to the at least one other user input, displaying, via a second screen view of the touch screen display:
at least one display area;
at least one other display area; and
at least one user visual indicator separating the at least one display area from the at least one other display area, the at least one display area being for display of the information, the at least one other display area being for display of others of the plurality of user selectable icons;
receiving, at least in part, via the touch screen display, at least one other user tap input associated with at least one other of the plurality of user selectable icons, the at least one other user tap input resulting, at least in part, in selection, for execution, of at least one other of the plurality of apps that corresponds, at least in part, to the at least one other of the icons;
in response, at least in part, to the at least one other user tap input, concurrently displaying, via the second screen view of the touch screen display:
the information in the at least one display area; and
other information to be provided, at least in part, via the at least one other of the plurality of apps, the other information to be displayed in the at least one other display area;
wherein:
the second screen view of the touch screen display comprises a split screen view of the touch screen display;
the plurality of apps comprises at least one additional app that is capable of being wirelessly downloaded, via at least one antenna of the tablet mobile computing device and the at least one network, to the storage from the remote server based, at least in part, upon at least one user selection associated with a displayable available app catalog of the app store;
in the operation of the tablet mobile computing device, the tablet mobile computing device is capable of providing, via the touch screen display, a virtual keyboard;
in the operation of the tablet mobile computing device, the tablet mobile computing device is capable of concurrently executing both the at least one of the plurality of apps and the at least one other of the plurality of apps; and
in the operation of the tablet mobile computing device, the tablet mobile computing device supports user-controlled dragging and dropping, between the at least one display area and the at least one other display area, of text for use in automatically activating a search.

10. The at least one non-transitory computer-readable medium of claim 9, wherein:
in the operation of the tablet mobile computing device:
the tablet mobile computing device is capable of displaying, via the touch screen display, user selectable home screen icons associated with native apps stored at the tablet mobile computing device;
the native apps are associated, at least in part, with capabilities of the operating system of the tablet mobile computing device.

11. The at least one non-transitory computer-readable medium of claim 9, wherein:
the at least one other of the plurality of apps is associated, at least in part, with at least one browser.

12. The at least one non-transitory computer-readable medium of claim 9, wherein:
in the split screen view of the touch screen display, the at least one display area and the at least one other display area are to be horizontally-oriented display areas.

13. The at least one non-transitory computer-readable medium of claim 9, wherein:
in the split screen view of the touch screen display, the at least one display area and the at least one other display area are to be vertically-oriented display areas.

14. The at least one non-transitory computer-readable medium of claim 9, wherein:
the tablet mobile computing device comprises a sensor to be used to determine, at least in part, orientation of tablet mobile computing device; and
in the split screen view of the touch screen display, display orientation of the at least one display area and the at least one other display area are to be changed based, at least in part, in part upon the orientation of the tablet mobile computing device.

15. The at least one non-transitory computer-readable medium of claim 9, wherein:
at least one visual indicator is movable, via at least one user touch and drag operation, so as to change the at least one display area and the at least one other display area; and
the tablet mobile comprising device comprises storage comprises flash memory to store, at least in part, the instructions.

16. The at least one non-transitory computer-readable medium of claim 9, wherein:
the first screen view of the touch screen display is to be displayed via a full screen mode of the touch screen display; and
the split screen view of the touch screen display is to be displayed via a split screen mode of the touch screen display.

17. A method implemented, at least in part, using a tablet mobile computing device, the tablet mobile computing device being capable, when the tablet mobile computing device is in operation, of wirelessly communicating, at least in part, via at least one Internet network, with an app store associated with a remote server, the tablet mobile computing device being capable of storing instructions to be executed by the tablet mobile computing device, the instructions corresponding, at least in part, to a plurality of apps and an operating system, the method comprising:
displaying, via a touch screen display of the tablet mobile computing device, a plurality of user selectable icons corresponding, at least in part, to the plurality of apps;
receiving, at least in part, via the touch screen display, at least one user tap input associated with at least one of the plurality of user selectable icons, the at least one user tap input resulting, at least in part, in selection for execution of at least one of the plurality of apps that corresponds, at least in part, to the at least one of the plurality of user selectable icons;
displaying, via a first screen view of the touch screen display, information to be provided, at least in part, via at least one of the plurality of apps;
receiving, at least in part, via the touch screen display, while the at least one of the plurality of apps is being executed and the information is being displayed, at least in part, via the first screen view, at least one other user input, the at least one other user input to be applied, at least in part, to an edge of the touch screen display, the at least one other user input comprising at least one dragging gesture;
in response, at least in part, to the at least one other user input, displaying, via a second screen view of the touch screen display:
at least one display area;
at least one other display area; and
at least one user visual indicator separating the at least one display area from the at least one other display area, the at least one display area being for display of the information, the at least one other display area being for display of others of the plurality of user selectable icons;
receiving, at least in part, via the touch screen display, at least one other user tap input associated with at least one other of the plurality of user selectable icons, the at least one other user tap input resulting, at least in part, in selection, for execution, of at least one other of the plurality of apps that corresponds, at least in part, to the at least one other of the icons;
in response, at least in part, to the at least one other user tap input, concurrently displaying, via the second screen view of the touch screen display:
the information in the at least one display area; and
other information to be provided, at least in part, via the at least one other of the plurality of apps, the other information to be displayed in the at least one other display area;
wherein:
the second screen view of the touch screen display comprises a split screen view of the touch screen display;
the plurality of apps comprises at least one additional app that is capable of being wirelessly downloaded, via at least one antenna of the tablet mobile computing device and the at least one network, to the storage from the remote server based, at least in part, upon at least one user selection associated with a displayable available app catalog of the app store;
in the operation of the tablet mobile computing device, the tablet mobile computing device is capable of providing, via the touch screen display, a virtual keyboard;
in the operation of the tablet mobile computing device, the tablet mobile computing device is capable of concurrently executing both the at least one of the plurality of apps and the at least one other of the plurality of apps; and
in the operation of the tablet mobile computing device, the tablet mobile computing device supports user-controlled dragging and dropping, between the at least one display area and the at least one other display area, of text for use in automatically activating a search.

18. The method of claim 17, wherein:
in the operation of the tablet mobile computing device:
the tablet mobile computing device is capable of displaying, via the touch screen display, user selectable home screen icons associated with native apps stored at the tablet mobile computing device;
the native apps are associated, at least in part, with capabilities of the operating system of the tablet mobile computing device;
the at least one other of the plurality of apps is associated, at least in part, with at least one browser.

19. The method of claim 17, wherein:
in the split screen view of the touch screen display, the at least one display area and the at least one other display area are to be horizontally-oriented display areas.

20. The method of claim 17, wherein:
in the split screen view of the touch screen display, the at least one display area and the at least one other display area are to be vertically-oriented display areas.

21. The method of claim 17, wherein:
the tablet mobile computing device comprises a sensor to be used to determine, at least in part, orientation of tablet mobile computing device;
in the split screen view of the touch screen display, display orientation of the at least one display area and the at least one other display area are to be changed based, at least in part, in part upon the orientation of the tablet mobile computing device;
at least one visual indicator is movable, via at least one user touch and drag operation, so as to change the at least one display area and the at least one other display area;
the tablet mobile comprising device comprises storage comprises flash memory to store, at least in part, the instructions;
the first screen view of the touch screen display is to be displayed via a full screen mode of the touch screen display; and
the split screen view of the touch screen display is to be displayed via a split screen mode of the touch screen display.

22. A tablet mobile computing device that is capable, when the tablet mobile computing device is in operation, of wirelessly communicating, at least in part, via at least one Internet network, with an app store associated with a remote server, the tablet mobile computing device comprising:
network interface means that comprises an antenna;
touch screen display means;
at least one processor means;
storage means capable of storing, at least in part, instructions that correspond to a plurality of apps and an operating system, the instructions being capable of being executed, at least in part, by the at least one processor means, the instructions, when executed, at least in part, by the at least one processor means resulting, at least in part, in the tablet mobile computing device being capable of performing operations comprising:
displaying, via the touch screen display means, a plurality of user selectable icons corresponding, at least in part, to the plurality of apps;
receiving, at least in part, via the touch screen display means, at least one user tap input associated with at least one of the plurality of user selectable icons, the at least one user tap input resulting, at least in part, in selection for execution of at least one of the plurality of apps that corresponds, at least in part, to the at least one of the plurality of user selectable icons;
displaying, via a first screen view of the touch screen display means, information to be provided, at least in part, via at least one of the plurality of apps;
receiving, at least in part, via the touch screen display means, while the at least one of the plurality of apps is being executed and the information is being displayed, at least in part, via the first screen view, at least one other user input, the at least one other user input to be applied, at least in part, to an edge of the touch screen display means, the at least one other user input comprising at least one dragging gesture;
in response, at least in part, to the at least one other user input, displaying, via a second screen view of the touch screen display means:
at least one display area;
at least one other display area; and
at least one user visual indicator separating the at least one display area from the at least one other display area, the at least one display area being for display of the information, the at least one other display area being for display of others of the plurality of user selectable icons;
receiving, at least in part, via the touch screen display means, at least one other user tap input associated with at least one other of the plurality of user selectable icons, the at least one other user tap input resulting, at least in part, in selection, for execution, of at least one other of the plurality of apps that corresponds, at least in part, to the at least one other of the icons;
in response, at least in part, to the at least one other user tap input, concurrently displaying, via the second screen view of the touch screen display means:
the information in the at least one display area; and
other information to be provided, at least in part, via the at least one other of the plurality of apps, the other information to be displayed in the at least one other display area;
wherein:
the second screen view of the touch screen display means comprises a split screen view of the touch screen display means;
the plurality of apps comprises at least one additional app that is capable of being wirelessly downloaded, via the at least one antenna and the at least one network, to the storage means from the remote server based, at least in part, upon at least one user selection associated with a displayable available app catalog of the app store;
in the operation of the tablet mobile computing device, the tablet mobile computing device is capable of providing, via the touch screen display means, a virtual keyboard;
in the operation of the tablet mobile computing device, the tablet mobile computing device is capable of concurrently executing both the at least one of the plurality of apps and the at least one other of the plurality of apps; and
in the operation of the tablet mobile computing device, the tablet mobile computing device supports user-controlled dragging and dropping, between the at least one display area and the at least one other display area, of text for use in automatically activating a search.

23. The tablet mobile computing device of claim 22, wherein:
in the operation of the tablet mobile computing device:
the tablet mobile computing device is capable of displaying, via the touch screen display means, user selectable home screen icons associated with native apps stored at the tablet mobile computing device;
the native apps are associated, at least in part, with capabilities of the operating system of the tablet mobile computing device;
the at least one other of the plurality of apps is associated, at least in part, with at least one browser.

24. The tablet mobile computing device of claim 22, wherein:
in the split screen view of the touch screen display means, the at least one display area and the at least one other display area are to be horizontally-oriented display areas.

25. The tablet mobile computing device of claim 22, wherein:
in the split screen view of the touch screen display means, the at least one display area and the at least one other display area are to be vertically-oriented display areas.

26. The tablet mobile computing device of claim 22, wherein:
the tablet mobile computing device comprises a sensor to be used to determine, at least in part, orientation of tablet mobile computing device;
in the split screen view of the touch screen display means, display orientation of the at least one display area and the at least one other display area are to be changed based, at least in part, in part upon the orientation of the tablet mobile computing device;
at least one visual indicator is movable, via at least one user touch and drag operation, so as to change the at least one display area and the at least one other display area;
the storage means comprises flash memory to store, at least in part, the instructions;
the first screen view of the touch screen display means is to be displayed via a full screen mode of the touch screen display means; and
the split screen view of the touch screen display means is to be displayed via a split screen mode of the touch screen display means.

27. A tablet mobile computing device that is capable, when the tablet mobile computing device is in operation, of wirelessly communicating via one or more Internet networks, with an app store associated with a remote server, the tablet mobile computing device comprising:
a network interface that comprises one or more antennae;
a touch screen display;
one or more processors;
storage capable of storing, at least in part, instructions that correspond to apps and an operating system, the instructions being capable of being executed, at least in part, by the one or more processors, the instructions, when executed, at least in part, by the one or more processors resulting in the tablet mobile computing device being capable of performing operations comprising:
displaying, via the touch screen display, user selectable icons corresponding to the apps;
receiving, via the touch screen display, one or more user tap inputs associated with one or more of the user selectable icons, the one or more user tap inputs resulting in selection for execution of one or more of the apps that correspond, at least in part, to the one or more of the user selectable icons;
displaying, via a first screen view of the touch screen display, information to be provided via the one or more of the apps;
receiving, via the touch screen display, while the one or more of the apps is being executed and the information is being displayed, via the first screen view, one or more other user inputs, the one or more other user inputs to be applied, at least in part, to an edge of the touch screen display, the one or more other user inputs comprising one or more dragging gestures;
in response, at least in part, to the one or more other user inputs, displaying, via a second screen view of the touch screen display:
one or more display areas;
one or more other display areas; and
one or more user visual indicators separating the one or more display areas from the one or more other display areas, the one or more display areas being for display of the information, the one or more other display areas being for display of others of the user selectable icons;
receiving, via the touch screen display, one or more other user tap inputs associated with one or more other of the user selectable icons, the one or more other user tap inputs resulting, at least in part, in selection, for execution, of one or more other of the apps that correspond, at least in part, to the one or more other of the icons;
in response, at least in part, to the one or more other user tap inputs, concurrently displaying, via the second screen view of the touch screen display:
the information in the one or more display areas; and
other information to be provided, at least in part, via the one or more other of the apps, the other information to be displayed in the one or more other display areas;
wherein:
the second screen view of the touch screen display comprises a split screen view of the touch screen display;
the apps comprise one or more additional apps that are capable of being wirelessly downloaded, via the one or more antennae and the one or more networks, to the storage from the remote server based, at least in part, upon one or more user selections associated with a displayable available app catalog of the app store;
in the operation of the tablet mobile computing device, the tablet mobile computing device is capable of providing, via the touch screen display, a virtual keyboard;
in the operation of the tablet mobile computing device, the tablet mobile computing device is capable of concurrently executing both the one or more of the apps and the one or more of other of the apps; and
in the operation of the tablet mobile computing device, the tablet mobile computing device supports user-controlled dragging and dropping, between the at least one display area and the at least one other display area, of text for use in automatically activating a search.

28. The tablet mobile computing device of claim 27, wherein:
- in the operation of the tablet mobile computing device:
  - the tablet mobile computing device is capable of displaying, via the touch screen display, user selectable home screen icons associated with native apps stored at the tablet mobile computing device; and
  - the native apps are associated, at least in part, with capabilities of the operating system of the tablet mobile computing device; and
- the one or more other of the apps is associated with at least one browser.

29. The tablet mobile computing device of claim 27, wherein:
- in the split screen view of the touch screen display, the one or more display areas and the one or more other display areas are to be horizontally-oriented display areas; and/or
- in the split screen view of the touch screen display, the one or more display areas and the one or more other display areas are to be vertically-oriented display areas.

30. The tablet mobile computing device of claim 27, wherein:
- the tablet mobile computing device comprises a sensor to be used to determine, at least in part, orientation of tablet mobile computing device;
- in the split screen view of the touch screen display, display orientation of the one or more display areas and the one or more other display areas are to be changed based, at least in part, in part upon the orientation of the tablet mobile computing device;
- one or more visual indicators are movable, via one or more user touch and drag operations, so as to change the one or more display areas and the one or more other display areas;
- the storage comprises flash memory;
- the first screen view of the touch screen display is to be displayed via a full screen mode of the touch screen display; and
- the split screen view of the touch screen display is to be displayed via a split screen mode of the touch screen display.

* * * * *